May 23, 1950      M. H. GROSS      2,508,384
METHOD AND MEANS FOR AUTOMATIC TRACKING AND/OR RANGING
Filed Sept. 8, 1943
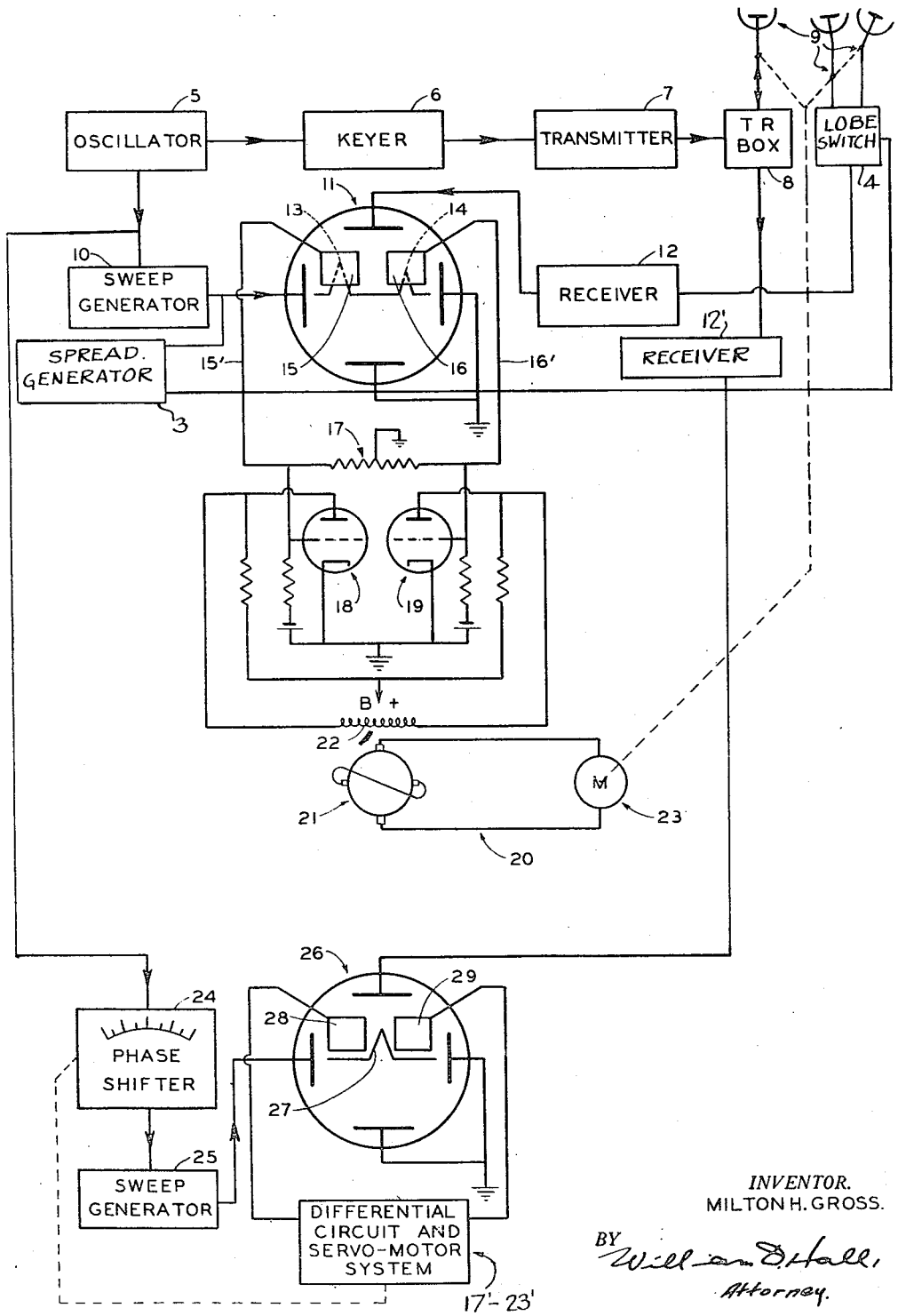
INVENTOR.
MILTON H. GROSS.
BY William D. Hall,
Attorney.

Patented May 23, 1950

2,508,384

UNITED STATES PATENT OFFICE 2,508,384

METHOD AND MEANS FOR AUTOMATIC TRACKING AND/OR RANGING

Milton H. Gross, Berkeley, Calif., assignor to the United States of America as represented by the Secretary of War Application September 8, 1943, Serial No. 501,515
10 Claims. (Cl. 343—7)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates to the automatic tracking and ranging of targets, and more particularly, to methods and means whereby a moving target, such as an aircraft, the presence of which has been detected preferably by the pulse-echo system known as radar, may be automatically followed as its spatial position, in direction (azimuth and/or elevation) and/or range, changes with respect to the detecting station.

Systems of this character have heretofore existed but have been exceedingly complicated in structure and operation.

It is therefore the main object of the present invention to generally improve such systems by providing methods and means for automatically following the changing spatial coordinates of a moving target, especially an aerial target, which involve relatively few components assembled in relatively simple circuits.

According to one form of the system for object detection known as radar, pulses of high frequency energy are radiated into space at an audio frequency rate, the antenna array employed for radiating such energy, which is preferably mounted for rotation through 360° of azimuth, being so designed as to have dual response patterns. By means of a lobe or pattern switching mechanism, the system is caused to become alternately responsive to the dual patterns and, as a result, echoes or reflections of the transmitted pulses, received from a target with which the radiated energy has come into contact and detected by the system, constitute comparative signals the amplitudes of which are functions of the spatial position of said target with respect to the antenna. Such a system is shown and described in the patent application of James R. Moore, entitled "Double tracking means for pulse echo system," Serial Number 467,266, filed November 28, 1942.

Further in accordance with said system, the echoes received from the target are applied to the vertically deflecting plates of an oscilloscope provided with two colinearly displaced horizontal base lines the sweep of each of which is synchronized with the pulse transmission of the system and the displacement of which is synchronized with the lobe switching. Thereby, the received signals, corresponding to the two antenna response patterns, appear upon the oscilloscope screen as two vertical deflections of the base lines, disposed side by side to enable visual comparison of their relative amplitudes. Equal deflections of the base lines indicate equal intensities in the received signals and equal intensities in the received signals indicate an "on target" condition; that is, a condition which results from the target being located somewhere in the vertical plane which is coincident with the mean axis of the two response patterns of the antenna array. It follows that unequal deflections of the oscilloscope base lines indicate that the intensity of the signals received through one response pattern is greater than those received through the other, thereby informing the observer that the antenna of the detection system is not so oriented with respect to the target as to satisfy the "on target" condition.

In the present invention the deflections of the electron beam of the oscilloscope are utilized to cause the generation of currents the amplitudes of which are functions of the position of the target with respect to the system, said currents being combined in opposition to obtain a net current the amplitude of which is a function of the deviation of the system from the "on target" condition, and the direction of flow of which is governed by the direction of said deviation. Said net current is used to compensate for said deviation by rotating the antenna array the amount and in such direction necessary to bring about the orientation of the system corresponding to the "on target" condition.

While the system thus far described has dealt with the tracking of a target in azimuth it is to be clearly understood that the same system can readily be used for tracking in elevation, or two such systems may readily be combined so as to simultaneously track in both azimuth and elevation.

In accordance with another function of radar, an antenna array requires only a single response pattern; the received echo energy is applied to the vertically deflecting plates of an oscilloscope having a single horizontal sweep synchronized with the pulse transmission of the system, a portion of the originally transmitted energy also being applied to said vertically deflecting plates whereby the original transmission appears as a vertical deflection of the oscilloscope base line at the commencement thereof, and the received echo energy appears, likewise in the form of a vertical displacement of the base line, somewhere along the length thereof depending upon the distance between the detection system and the target. This distance is, in effect, equivalent to a phase displacement between the original pulse transmission and the reception of the echoes, so that by shifting the time of the commencement of the oscilloscope sweep with respect to the pulse transmission of the system, the echo deflections can be moved along the base line until they appear at the position originally occupied by the pulse transmission deflections and the amount of phase shift necessary to accomplish this result becomes a measure of the range of the target. Such a system of range determination is shown and described in the application of Samuel H. Anderson, entitled "Method and means for determining range," Serial Number 470,376, filed December 28, 1942.

In the present invention this system is modified so as always to maintain the echo deflections in the same position on the oscilloscope screen and utilize any deviation from this position, which is caused by a change in the initial time difference between the pulse transmission and the reception of the echo, in other words, a change in the range, to automatically adjust a sweep phase shifting device which is calibrated in terms of distance, thereby presenting to the observer a continuous reading of the range of the target.

While either the tracking system or the ranging system generally described above may be used alone, it is preferable that they be used together so that the observer will at all times be aware of the exact location of the target, such condition being particularly essential where the detection system is being used for gun-laying or fire-control.

In the accompanying specification I describe and in the annexed drawings show illustrative embodiments of a preferred form of the methods and means of the present invention above set forth and directed to tracking and ranging. It is however, to be clearly understood that the present invention is not to be limited to said illustrative embodiment inasmuch as changes may be made within the true spirit and scope of the invention as expressed in the claims hereto annexed.

The drawing is a partial schematic, partial block diagram of an automatic tracking and ranging system assembled in accordance with the principles of the present invention.

Referring now more in detail to the radar system for object detection previously mentioned to enable the automatic tracking of targets, the numeral 5 designate a conventional audio frequency oscillator, a portion of the sine wave output of which is fed to a suitable keyer 6 adapted to distort the same into short, sharp pulses for periodically keying a transmitter 7 adapted to generate high frequency energy. The output of the transmitter 7, constituting audio frequency pulses of radio frequency energy, is conveyed, through suitable transmission lines and a "TR box" 8, which constitutes a protecting circuit to prevent undue shock to the receiver of the system, to an antenna array 9, preferably having highly directional characteristics and preferably being mounted to permit rotation through 360° of azimuth.

Another portion of the output of the oscillator 5 is fed to a sweep generator 10 adapted to generate a sweep voltage which is linear with time and synchronized with the pulse transmission rate of the system, the output of the generator 10 being applied to the horizontally deflecting plates of an oscilloscope 11. A square wave generator 3 is provided as a spread generator for intermittently superimposing a D.-C. potential upon said linear sweep at a low audio frequency rate, whereby said oscilloscope is provided with two colinearly displaced horizontal base lines.

The directional antenna array 9 is designed to have a dual response pattern and provision is made through a lobe switch 4 actuated by a portion of the square wave output of square wave generator 3, to switch from one pattern to the other whereby the system becomes alternately responsive to the signals received through the two patterns in synchronism with the shifting of the base lines of the oscilloscope 11.

Echoes of the originally transmitted pulse energy are picked up by the antenna array 9 and are fed, through the lobe switch 4 to a conventional receiver 12, the output of said receiver being applied to the vertically deflecting plates of the oscilloscope 11 whereby the echo signals appear upon the screen of the oscilloscope 11 in the form of two vertical displacements 13 and 14 of the oscilloscope base lines, disposed side by side for comparison of their relative amplitudes.

The system thus far described is substantially as disclosed in the James R. Moore patent application to which reference has been made in earlier portions of this specification.

In accordance with the present invention, the vertical deflections of the electron beam of the oscilloscope are utilized to generate a current for controlling the orientation of the antenna array with respect to the position in space of the target being tracked.

For this purpose, the oscilloscope screen has mounted on the outer surface thereof, so as to include the areas within which the base lines are deflected by the received echoes, a pair of conducting plates 15 and 16, each of said plates, together with a corresponding portion of the fluorescent coating with which the inner surface of the oscilloscope screen is conventionally provided and the intervening glass or other dielectric material of which the screen may be made, constituting a capacitor adapted to be charged whenever the electron beam of the oscilloscope becomes deflected by the echo signals into the areas bounded by the appropriate conducting plate 15 or 16.

Obviously, the amount of charge acquired by each capacitor is a function of the amplitude of the deflection of the electron beam and inasmuch as the amplitude of the deflection of the electron beam is a function of the intensity of the received echo signals, the charge acquired by each capacitor becomes a function of the position in space of the target being tracked with respect to the antenna array 9.

In order to convert the charges acquired by each plate 15 and 16 into a corresponding current, said plates are respectively connected through conductors 15' and 16' to the opposite ends of a center tapped and grounded resistor 17. The amplitudes of the currents thus generated are quite small and amplification is necessary. This may be achieved by applying the voltage drop across each half of the resistor 17 to a conventional vacuum tube amplifier 18 and 19, each biased to normally draw the same current as the other.

In order to obtain a net current for controlling the orientation of the antenna array 9 the outputs of the amplifiers 18 and 19 are combined in opposition in a servo-motor system 20 which preferably includes an amplidyne generator 21 having a field coil 22 receptive of said amplifier outputs, and a reversive D.-C. motor 23 which is receptive of the output of the generator 21. By means of this arrangement a net current is obtained the amplitude of which is a function of the deviation of the system from the "on target" condition, as defined in earlier portions of this specification, and the direction of flow of which is governed by the direction of said deviation.

The motor 23 is mechanically coupled, as shown by the broken line in the drawing, through appropriate gearing, to the antenna array 9 whereby the latter is rotated an amount and in such direction as to so orient the antenna array 9 to result in the reception thereby of signals of equal intensity. Such a condition will obtain when the target being tracked is located somewhere in the vertical plane which is coincident with the mean axis of the response patterns of the antenna array, such coincidence corresponding to the "on target" condition. Obviously, whenever such condition is fulfilled, the deflections of the electron beam of the oscilloscope 11 will be equal, the charges acquired by each of the plates 15 and 16 will be equal, the outputs of the amplifiers 18 and 19 will be equal, and there will be no net current in the field coil 22 of the generator 21. The servo-motor system 20 will therefore be inoperative until such time as the target changes its position with respect to the detection system, at which time a net current will be fed to the servo-motor system 20 which, as stated, will be proportional to the extent of the deviation from the "on target" condition.

Referring now more in detail to the features of automatic ranging, the transmitting and receiving channels are the same as has been described in connection with the automatic tracking arrangement, except that the antenna array has a single response pattern.

In addition, the second portion of the sine wave output of the oscillator 5 is passed through any preferred phase shifter 24 which may be calibrated directly in terms of distance, and the output of the phase shifter is fed to a sweep generator 25 adapted to generate a sweep voltage, linear with time, which is applied to the horizontally deflecting plates of an oscilloscope 26 to provide the same with a single horizontal base line. The output of the corresponding receiver 12' is, as before, applied to the vertically deflecting plates of the oscilloscope.

By means of such an arrangement, which is more completely disclosed in the Samuel H. Anderson application to which reference has been made in earlier portions of this application, the phase difference between the commencement of the oscilloscope sweep, which is synchronized with the pulse transmission of the system and initially coincident therewith, and the reception of the reflected echoes, constitutes a measure of the range of the target and any change in the range of said target obviously results in a change in said phase difference.

In order to automatically follow any change in this phase difference the screen of the oscilloscope 26 is provided, on both sides of the displacement 27 corresponding to the received echo signals, with conducting plates 28 and 29. These plates, as described in connection with the automatic tracking system, together with the portions of the fluorescent coating of the oscilloscope screen which lie within the borders thereof and the intervening glass, constitute capacitors which remain uncharged until such time as the areas of the screen bounded by either of the plates become bombarded by the electron beam of the oscilloscope. This occurs whenever the range of the target changes; for, such a change in range constitutes a change in the time difference between the commencement of the oscilloscope sweep and the reception of the echo energy, whereby the displacement 27 of the oscilloscope base line moves toward or away from the commencement of said base line depending upon the direction of the change of the range.

The circuits employed for utilizing the charges acquired by the plates 28 and 29 to obtain a control current are the same as those employed in connection with the automatic tracking system and therefore need not be repeated in detail at this point. However, instead of the motor 23' being mechanically coupled with the antenna array 9, it is mechanically coupled, as indicated by the broken line, through appropriate gearing, with the phase shifter 24. By means of this arrangement any change in the range of the target, which causes a change in the phase difference between the commencement of the oscilloscope sweep and the reception of the echo energy, is utilized to automatically adjust the phase shifter 24 so as to compensate for the deviation and always maintain the base line displacement 27 substantially in the same position on the screen of the oscilloscope as it originally occupies, and it is only necessary to read the extent of said deviation on the distance calibrated phase shifter 24.

While I have shown and described conducting plates which together with certain portions of the oscilloscope screen form capacitors adapted to become charged as a function of the spatial position of the target, other means, such as selenium cells or photo-emissive cells, may be substituted therefor.

There has thus been described a complete system for automatically following any changes in the spatial coordinates of a moving target, such as an aircraft, one portion of the system being adapted to automatically follow changes in azimuth or, it will be understood, elevation, or both, and the other portion of the system being adapted to present to the observer continuous readings of the range of the target being followed.

It will be noted that said system requires very few components which are connected in very simple circuits, thereby assuring maximum dependability and ease of operation.

I claim:

1. The method of utilizing a cathode ray tube which includes the steps of applying at least two comparative signals to said tube to deflect the electron beam thereof in proportion to the intensities of said signals, coupling to said electron beam during each period of deflection to build up an electric charge proportional to the intensity of the deflecting signal, impressing each such charge on a corresponding circuit to initiate a current flow, and combining the resulting currents in opposition to obtain a net current the amplitude of which is a function of the intensities of said comparative signals and the direction of flow of which is governed by that of the current of greatest intensity.

2. In a radio detection system transmitting successive pulses of energy and receiving echoes from a target, the delay of said echoes with respect to said pulses being proportional to the range of said target, and transforming said echoes into deflections of an electron beam having a sweep synchronized with said pulses, those steps in the method of automatically following changes in the range of said target which include, adjusting the phase of said sweep relative to said pulses until the delay of the initial deflections relative to said pulses corresponds to the initial range of said target, generating an electrical quantity proportional in amount and polarity to the deviation from said initial range, and altering the phase of said sweep with respect to said pulses by means of said electrical quantity to compensate for said deviation.

3. In a radio detection system adapted to receive from a target a succession of signals the phase of each of which with respect to the commencement of a locally generated reference cycle is a function of the range of said target and transform the same into deflections of an electron beam having a sweep synchronized with said reference cycle, those steps in the method of automatically following changes in the range of said target which include, adjusting the phase of said sweep so that the initial phase difference between the deflections of said electron beam and the commencement of said reference cycle corresponds to the initial range of said target, generating an electric charge proportional to the deviation from said initial position generating a current proportional to said electric charge the amplitude of which is a function of the extent of any change in the range of said target and the direction of flow of which is governed by the direction of any such change in the range, and altering the phase of said sweep with respect to the commencement of said locally generated cycle by means of said current to compensate for said deviation.

4. In a radio detection system transmitting successive pulses of energy and receiving echoes from a target, portions of said echoes being of comparative intensity dependent on the direction of said target with respect to said system and transformed into separate deflections of corresponding amplitude of an electron beam, those steps in the method of automatically following changes in the direction of said target which include, generating an electrical quantity proportional in amount and polarity to the difference in said separate deflections, and altering the directivity of said system by means of said second electrical quantity.

5. In a radio detection system transmitting successive pulses of energy and receiving echoes from a target, the delay of said echoes with respect to said pulses being proportional to the range of said target, and transforming said echoes into deflections of an electron beam having a sweep synchronized with said pulses, portions of said echoes being of comparative intensity dependent on the direction of said target with respect to said system and transformed into separate deflections of corresponding amplitude of a second electron beam, those steps in the method of automatically following changes in the range and direction of said target which include, adjusting the phase of said sweep relative to said pulses until the delay of the initial deflections relative to said pulses corresponds to the initial range of said target, generating an electrical quantity proportional in amount and polarity to the deviation from said initial range, altering the phase of said sweep with respect to said pulses by means of said electrical quantity to compensate for said deviation, generating a second electrical quantity proportional in amount and polarity to the difference in said separate deflections, and altering the directivity of said system by means of said second electrical quantity.

6. In a radio detection system having dual input channels, one channel being adapted to receive from a target comparative signals the relative intensities of which are functions of the position in azimuth of said target with respect to said system and transform said comparative signals into corresponding relative deflections of an electron beam; and the other channel being adapted to receive from said target a succession of substantially uniform-intensity signals the phase of each of which with respect to the commencement of a locally generated reference cycle is a function of the range of said target and transform said second named signals into deflections of an electron beam having a sweep synchronized with said reference cycle, those steps in the method of automatically following any changes in the spatial coordinates of said target which include, generating a plurality of electric charges proportional to the deflection of said first electron beam caused by said comparative signals, generating a single electric charge proportional to any deviation of the phase of said substantially uniform-intensity signals with respect to said reference cycle, combining said plurality of electric charges to orient said detection system in accordance with any change in the position in azimuth of said target, and altering the phase of said sweep with respect to the commencement of said reference cycle to compensate for said deviation.

7. In combination with a radio detection system, means for automatically following any changes in position of a detected target comprising, a cathode ray tube having means for deflecting the electron beam thereof in accordance with a succession of signals received by said detection system from said target, means for transforming the deflections of said beam into at least one electric charge proportional to the received signal intensity, means for converting said charge into a flow of current, and means for using said current to adjust said detection system in accordance with any change in the position of said target.

8. In combination with a radio detection system, means for automatically following any changes in position of a detected target comprising, a cathode ray tube having means for deflecting the electron beam thereof in accordance with a succession of signals received by said detection system from said target, a pair of resistance-capacitance networks associated with said cathode ray tube to receive electric charges from the electron beam thereof during said deflections and transform the same into current flows, means for combining the resulting currents in opposition, and means for using said combined currents to adjust said dectection system in accordance with any change in the position of said target.

9. In combination with a radio detection system, means for automatically following any changes in position of a detected target comprising, a cathode ray tube having means for deflecting the electron beam thereof in accordance with a succession of signals received by said detection system from said target, a pair of resistance-capacitance networks associated with said cathode ray tube to receive electric charges from the electron beam thereof during said deflections and transform the same into current flows, and a servomotor system for combining said currents in opposition and adjusting said detection system in accordance with any change in the position of said target.

10. In combination with a radio detection system, means for automatically following any changes in position of a detected target comprising, an oscilloscope the electron beam of which is adapted to be deflected in accordance with a succession of signals received by said detection system from said target, a pair of conducting plates spaced from each other and mounted on the outer surface of the screen of said oscilloscope, said plates together with the portions of the fluorescent coating of said screen which underlay the same constituting capacitors adapted to be charged by said electron beam when the latter is deflected within the boundaries thereof, means for transforming the charges so obtained into current flows, means for combining the resulting currents in opposition, and means for using the net current produced by said combination to adjust said detection system in accordance with any change in the position of said target.

MILTON H. GROSS.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,312,203 | Wallace | Feb. 23, 1943 |
| 2,409,462 | Zworykin | Oct. 15, 1946 |

FOREIGN PATENTS

| Number | Country | Date |
|---|---|---|
| 366,989 | Great Britain | Feb. 5, 1932 |